United States Patent
Spangler et al.

(10) Patent No.: US 9,726,023 B2
(45) Date of Patent: Aug. 8, 2017

(54) AIRFOIL SUPPORT AND COOLING SCHEME

(71) Applicant: United Technologies Corporation, Hartford, CT (US)

(72) Inventors: Brandon W. Spangler, Vernon, CT (US); Edwin Otero, Southington, CT (US); Daniel A. Snyder, Manchester, CT (US); Jaimie Taraskevich, Tolland, CT (US); Di Wu, West Hartford, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 349 days.

(21) Appl. No.: 14/605,366

(22) Filed: Jan. 26, 2015

(65) Prior Publication Data

US 2016/0215628 A1    Jul. 28, 2016

(51) Int. Cl.
*F01D 5/18*  (2006.01)
*F01D 5/14*  (2006.01)
*F02C 3/04*  (2006.01)
*F02C 7/18*  (2006.01)

(52) U.S. Cl.
CPC ............ *F01D 5/187* (2013.01); *F01D 5/147* (2013.01); *F02C 3/04* (2013.01); *F02C 7/18* (2013.01); *F05D 2220/32* (2013.01); *F05D 2240/35* (2013.01); *F05D 2260/22141* (2013.01); *Y02T 50/676* (2013.01)

(58) Field of Classification Search
CPC .......... F01D 5/187; F01D 5/147; F01D 5/188; F01D 5/18; F02C 3/04; F02C 7/18; Y02T 50/676; F05D 2240/35; F05D 2220/32; F05D 2260/22141

USPC ............................... 244/123.4; 416/233, 97 R
See application file for complete search history.

(56) References Cited

U.S. PATENT DOCUMENTS

| 5,253,824 | A | * | 10/1993 | Halila | F01D 5/147 244/123.14 |
| 5,403,159 | A | * | 4/1995 | Green | F01D 5/187 416/97 R |
| 5,591,007 | A | * | 1/1997 | Lee | F01D 5/187 416/97 R |

(Continued)

FOREIGN PATENT DOCUMENTS

| DE | EP 1510653 A2 * | 3/2005 | ............... F01D 5/16 |
| EP | 1510653 | 3/2005 | |

(Continued)

OTHER PUBLICATIONS

Extended European Search Report dated Jun. 10, 2016 in European Application No. 16152777.5.

*Primary Examiner* — Phutthiwat Wongwian
*Assistant Examiner* — Jason T Newton
(74) *Attorney, Agent, or Firm* — Snell & Wilmer L.L.P.

(57) ABSTRACT

In various embodiments, an airfoil used as a turbine blade for a turbine wheel in a gas turbine engine is provided. The airfoil may comprise a root, a tip, and a body. The root may have a first area. The tip may have a second area. The body may have a chord bounded by the root and the tip. The body may also define a cooling chamber. The cooling chamber may have a first rib substantially perpendicular to the chord. The cooling chamber may also have a second rib extending partially between the root and the tip.

20 Claims, 4 Drawing Sheets

(56) References Cited

U.S. PATENT DOCUMENTS

| | | | | |
|---|---|---|---|---|
| 5,902,093 A * | 5/1999 | Liotta | F01D 5/20 | 415/115 |
| 6,126,396 A * | 10/2000 | Doughty | F01D 5/187 | 416/97 R |
| 6,220,817 B1 * | 4/2001 | Durgin | F01D 5/187 | 415/115 |
| 6,290,463 B1 * | 9/2001 | Fargher | F01D 5/187 | 415/115 |
| 7,918,647 B1 * | 4/2011 | Liang | F01D 5/188 | 416/96 A |
| 7,955,053 B1 * | 6/2011 | Liang | F01D 5/187 | 415/115 |
| 7,988,419 B1 * | 8/2011 | Liang | F01D 5/187 | 416/96 R |
| 8,118,553 B2 * | 2/2012 | Liang | F01D 5/187 | 415/115 |
| 8,317,472 B1 * | 11/2012 | Liang | F01D 5/187 | 416/92 |
| 8,628,298 B1 * | 1/2014 | Liang | F01D 5/187 | 416/96 R |
| 9,145,780 B2 * | 9/2015 | Propheter-Hinckley | F01D 5/186 | |
| 2005/0265842 A1 * | 12/2005 | Mongillo, Jr. | F01D 5/187 | 416/97 R |
| 2006/0280606 A1 * | 12/2006 | Busbey | F01D 5/187 | 416/97 R |
| 2007/0009358 A1 * | 1/2007 | Kohli | F01D 5/187 | 416/97 R |
| 2008/0085193 A1 * | 4/2008 | Liang | F01D 5/187 | 416/97 R |
| 2008/0118366 A1 * | 5/2008 | Correia | F01D 5/187 | 416/97 R |
| 2008/0131285 A1 * | 6/2008 | Albert | B22C 9/04 | 416/96 R |
| 2009/0068022 A1 * | 3/2009 | Liang | F01D 5/187 | 416/97 R |
| 2009/0214328 A1 * | 8/2009 | Tibbott | F01D 5/187 | 415/115 |
| 2010/0226788 A1 * | 9/2010 | Liang | F01D 5/187 | 416/97 R |
| 2011/0206536 A1 * | 8/2011 | Pal | F01D 5/186 | 416/97 R |
| 2011/0268562 A1 * | 11/2011 | Knight, III | F01D 5/18 | 415/179 |
| 2013/0259704 A1 * | 10/2013 | Zhang | F01D 5/081 | 416/97 R |
| 2013/0280080 A1 * | 10/2013 | Levine | F01D 5/187 | 416/223 R |
| 2014/0093387 A1 * | 4/2014 | Pointon | F01D 5/187 | 416/97 R |
| 2014/0169962 A1 * | 6/2014 | Lee | F01D 5/186 | 416/1 |
| 2016/0108740 A1 * | 4/2016 | Srinivasan | F01D 5/188 | 60/806 |

FOREIGN PATENT DOCUMENTS

| | | |
|---|---|---|
| EP | 1600605 | 11/2005 |
| EP | 2708296 | 3/2014 |
| EP | 2713011 | 4/2014 |
| EP | 3020923 | 5/2016 |
| GB | 2349920 | 11/2000 |
| WO | 9412766 | 6/1994 |

* cited by examiner

B-B

US 9,726,023 B2

AIRFOIL SUPPORT AND COOLING SCHEME

FIELD

The present disclosure relates to gas turbine engine airfoils, and more particularly, to airfoils with partial ribs and internal cooling.

BACKGROUND

Typical airfoils in gas turbine engines include cooling channels. These cooling channels are typically defined by support ribs in an internal chamber of the airfoil. In this regard, the ribs create flow channels within the hollow volume of the airfoil that are fed with cooling air to cool the airfoil. This may allow the airfoil to operate at a higher temperature, at greater pressure and/or at higher speed.

SUMMARY

In various embodiments, an airfoil may comprise a root, a tip, and a body. The root may have a first area. The tip may have a second area. The body may have a chord bounded by the root and the tip. The body may also define a cooling chamber. The cooling chamber may have a first rib substantially perpendicular to the chord. The cooling chamber may also have a second rib extending from the tip region toward the root. The second rib may terminate at a point in the cooling chamber between the root and the tip.

In various embodiments, a turbine wheel may comprise a wheel body and a plurality of airfoils. The each of the airfoils of the plurality of airfoils may define a cooling chamber. Each of the plurality of airfoils may comprise a first rib extending partially between the root and the tip. The first rib may have a length that is less than 50 percent of the chord between the root and tip. Each of the plurality of airfoils may also comprise a second rib extending partially across the cooling chamber between the root and the tip. Each of the second ribs may be substantially parallel to the root and the tip.

In various embodiments, a gas turbine engine may comprise a compressor section, a combustor, and a turbine section. The combustor may be in fluid communication with the compressor. The turbine section may be in fluid communication with the combustor. The turbine section may comprise a turbine wheel having a plurality of airfoils. Each of the airfoils may define a chamber. The chamber may be configured to receive and distribute cooling airflow. Each of the airfoils may comprise a root, a tip, a chord, a first rib, and a second rib. The chord may be defined between the root and the tip. The first rib may partially extend between the root and the tip. The second rib may partially extend across the chamber substantially perpendicular to the chord between the root and the tip.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice these embodiments, it should be understood that other embodiments may be realized and that logical changes and adaptations in design and construction may be made in accordance with the present disclosure and the teachings herein. Thus, the detailed description herein is presented for purposes of illustration only and not for providing limitations on the scope of the disclosure. For example, the steps recited in any of the methods or process descriptions may be executed in any order and are not limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Moreover, surface shading lines may be used throughout the figures to denote different parts but not necessarily to denote the same or different materials.

Figure 1:
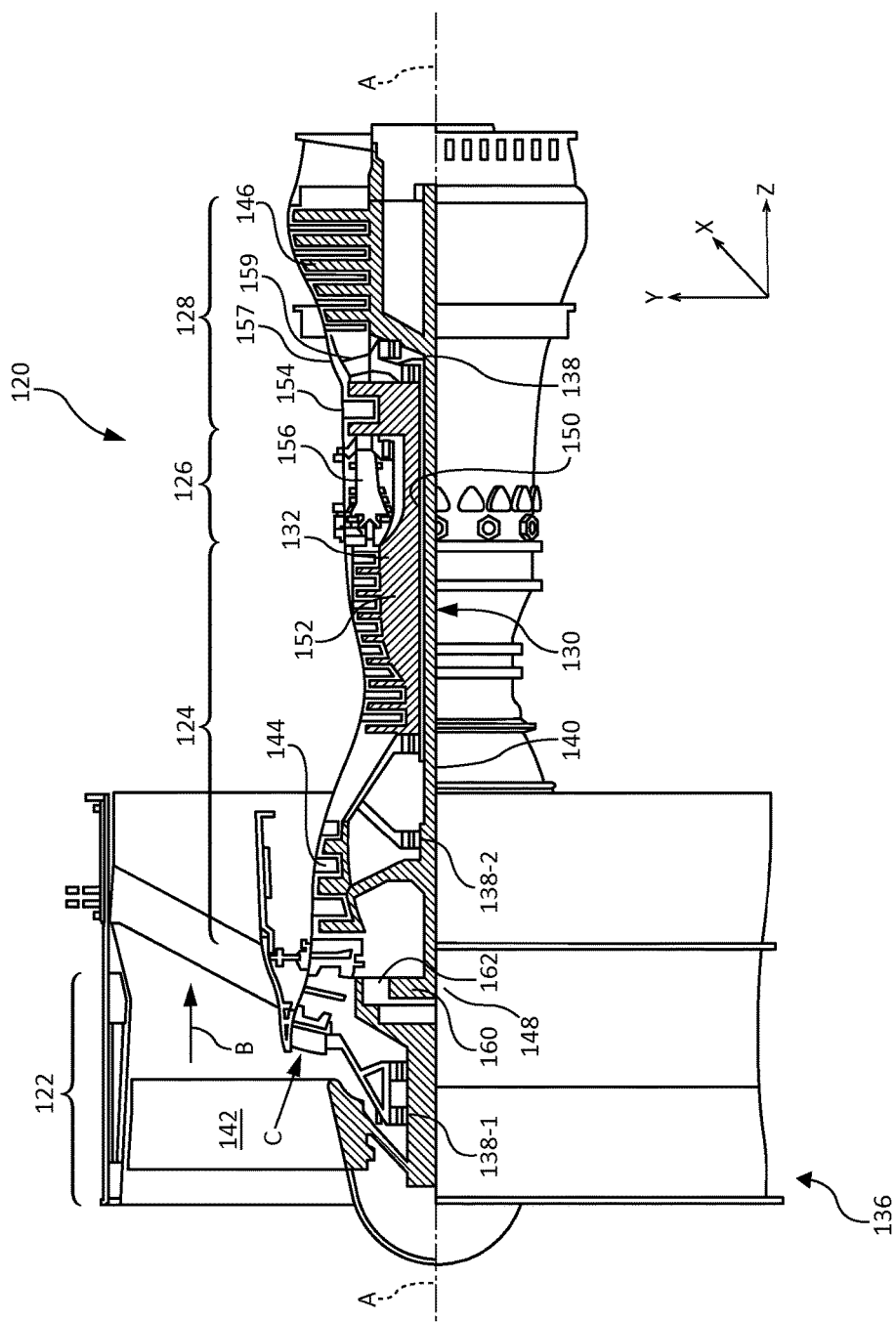
FIG. 1 illustrates cross-sectional view of an exemplary gas turbine engine, in accordance with various embodiments.

In various embodiments and with reference to FIG. 1, a gas turbine engine 120 is provided. Gas turbine engine 120 may be a two-spool turbofan that generally incorporates a fan section 122, a compressor section 124, a combustor section 126 and a turbine section 128. Alternative engines may include, for example, an augmentor section among other systems or features. In operation, fan section 122 can drive air along a bypass flow-path B while compressor section 124 can drive air along a core flow-path C for compression and communication into combustor section 126 then expansion through turbine section 128. Although depicted as a turbofan gas turbine engine 120 herein, it should be understood that the concepts described herein are not limited to use with turbofans as the teachings may be applied to other types of turbine engines including three-spool architectures.

Gas turbine engine 120 may generally comprise a low speed spool 130 and a high speed spool 132 mounted for rotation about an engine central longitudinal axis A-A' relative to an engine static structure 136 via one or more bearing systems 138 (shown as bearing system 138-1 and bearing system 138-2 in FIG. 1). It should be understood that various bearing systems 138 at various locations may alternatively or additionally be provided including, for example, bearing system 138, bearing system 138-1, and bearing system 138-2.

Low speed spool 130 may generally comprise an inner shaft 140 that interconnects a fan 142, a low pressure (or first) compressor section 144 and a low pressure (or second) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 couples inner shaft 140 to a rotating fan structure. High speed spool 132 may comprise an outer shaft 150 that interconnects a high pressure compressor ("HPC") 152 (e.g., a second compressor section) and high pressure (or first) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and rotate via bearing systems 138 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 144 then HPC 152, mixed and burned with fuel in combustor 156, then expanded over high pressure turbine 154 and low pressure turbine 146. Mid-turbine frame 157 includes airfoils 159 which are in the core airflow path. Low pressure turbine 146 and high pressure turbine 154 rotationally drive the respective low speed spool 130 and high speed spool 132 in response to the expansion.

Gas turbine engine 120 may be, for example, a high-bypass geared aircraft engine. In various embodiments, the bypass ratio of gas turbine engine 120 may be greater than about six (6). In various embodiments, the bypass ratio of gas turbine engine 120 may be greater than ten (10). In various embodiments, geared architecture 148 may be an epicyclic gear train, such as a star gear system (sun gear in meshing engagement with a plurality of star gears supported by a carrier and in meshing engagement with a ring gear) or other gear system. Geared architecture 148 may have a gear reduction ratio of greater than about 2.3 and low pressure turbine 146 may have a pressure ratio that is greater than about 5. In various embodiments, the bypass ratio of gas turbine engine 120 is greater than about ten (10:1). In various embodiments, the diameter of fan 142 may be significantly larger than that of the low pressure compressor 144, and the low pressure turbine 146 may have a pressure ratio that is greater than about 5:1. Low pressure turbine 146 pressure ratio may be measured prior to inlet of low pressure turbine 146 as related to the pressure at the outlet of low pressure turbine 146 prior to an exhaust nozzle. It should be understood, however, that the above parameters are exemplary of various embodiments of a suitable geared architecture engine and that the present disclosure contemplates other gas turbine engines including direct drive turbofans.

Figure 2A:
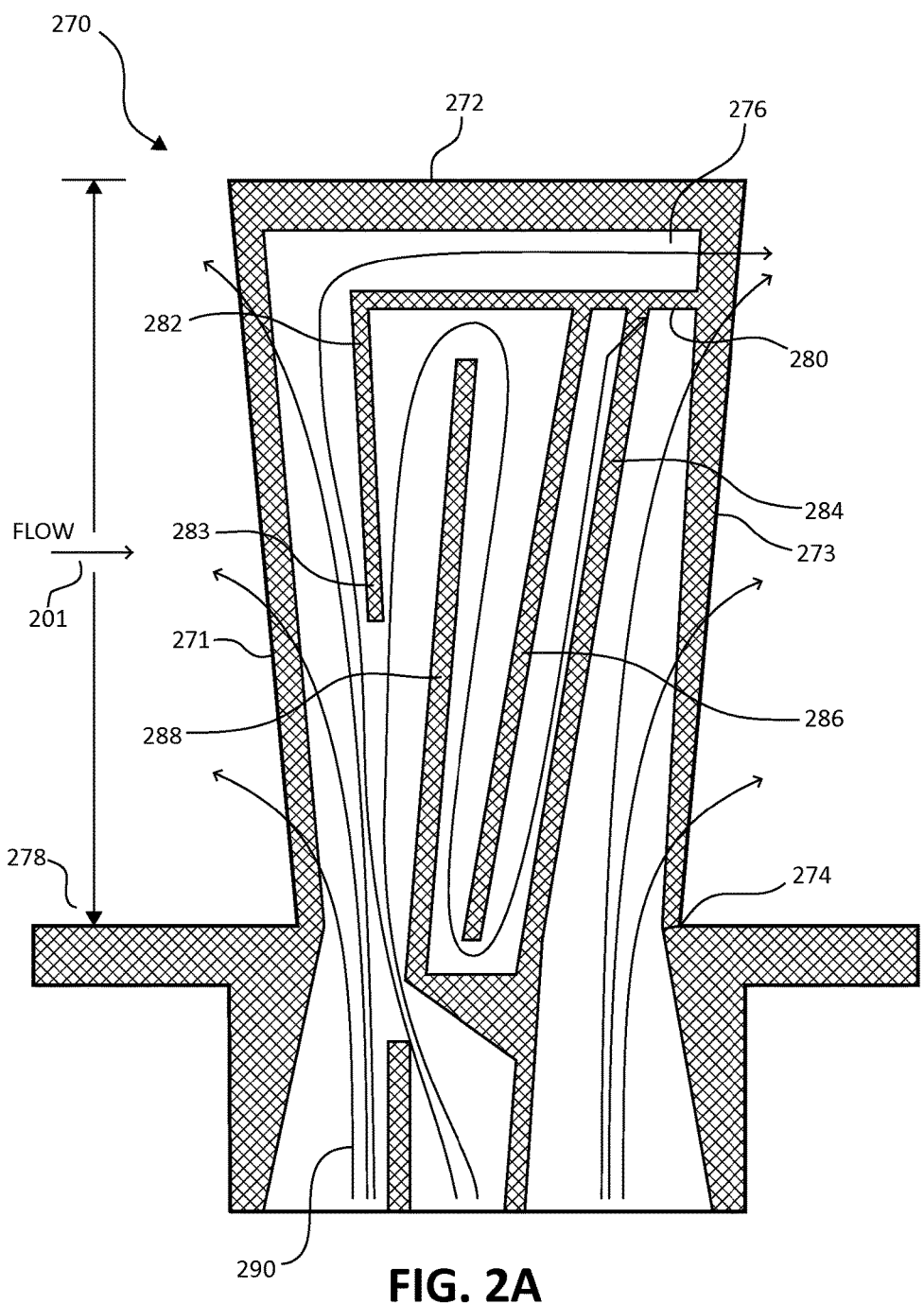
FIG. 2A schematically illustrates a cross-sectional view of a first airfoil, in accordance with various embodiments.
Figure 2B:
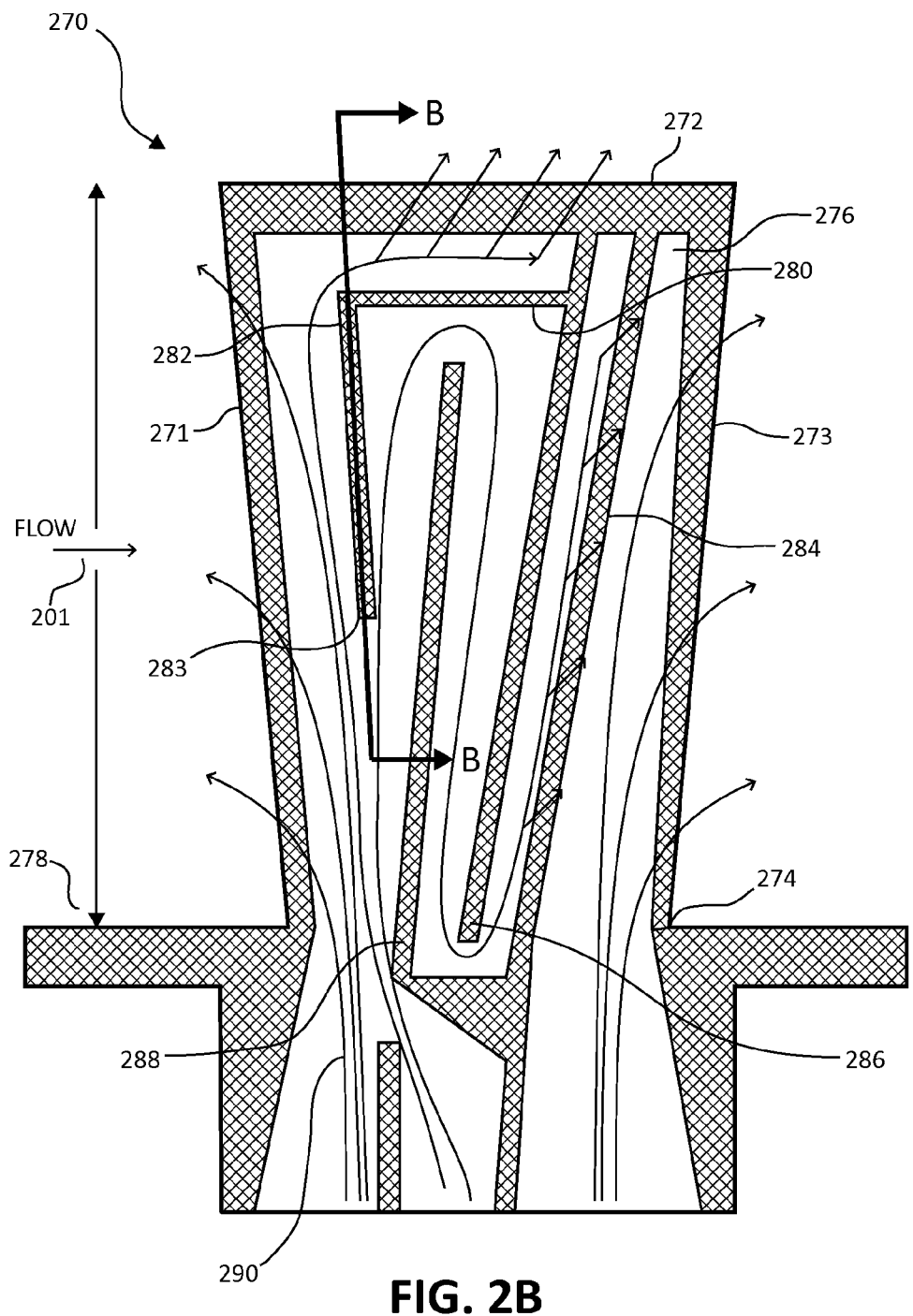
FIG. 2B schematically illustrates a cross-sectional view of a second airfoil, in accordance with various embodiments.

In various embodiments and with reference to FIG. 2A and FIG. 2B, large tip airfoils (e.g., large tip turbine blades) require special structural schemes. These structural schemes must support the structure of the airfoil and provide appropriate cooling flow. The structural support schemes may include one or more partial or full ribs in the airfoil. The ribs defined within the cooling chamber defined by the airfoil may be designed to prevent or minimize bulge and panel vibration. Bulge and panel vibration may be caused by the large tip configuration of the airfoil.

In various embodiments, airfoil 270 may have a tip 272, a root 274, and a chord 278 spanning the distance between tip 272 and root 274. Where airfoil 270 is a large tip airfoil, tip 272 may be wider than root 274. In this regard, the area of airfoil 270 associated with root 274 (e.g., a first area) may be smaller than the area of airfoil 270 associated with tip 272 (e.g., the second area).

In various embodiments, airfoil 270 may further comprise a leading edge 271 and a trailing edge 273. Cooling flow 290 may be routed within cooling chamber 276 to any exterior portion of airfoil 270 including, for example, to portions of leading edge 271, tip 272, trailing edge 273 and/or root 274.

In various embodiments, one or more ribs may be defined in cooling chamber 276 to support the structure of airfoil 270. Where airfoil 270 is a large tip airfoil, one or more ribs may be included to provide structural support and distribution of cooling flow 290. In that regard, the one or more ribs may reduce the impact of bulge and/or panel vibration. The one or more ribs may also provide various channels for distribution of cooling flow 290 within cooling chamber 276.

In various embodiments, airfoil 270 may comprise one or more ribs. The ribs may be of any suitable shape or size. For example, airfoil 270 may comprise a rib 284 that extends between the root 274 and the tip 272. In this regard, rib 284 may originate from and/or extend from a structure associated with and/or in the area associated with root 274 and terminate at tip 272, as shown in FIG. 2B. Rib 284 may also originate from and/or extend from a structure associated with and/or in the area associated with root 274 and terminate in a structure within the chamber (e.g., rib 280, as shown in FIG. 2A).

In various embodiments, rib 286 may originate and/or extend from tip 272 to a region and/or area associated with root 274, as shown in FIG. 2B. Rib 286 may also extend from a region associated with tip 272 (e.g., rib 280) to a region associated with root 274, as shown in FIG. 2A. In this regard, rib 286 may have a cantilevered style configuration, such that it terminates in the region or area associated with root 274 of cooling chamber 276 but does not terminate in a structure associated with root 274.

In various embodiments, airfoil 270 may also comprise one or more partial ribs, including, for example, rib 280 and rib 282. These partial ribs may be oriented within cooling chamber 276 in any fashion to reduce panel bulge or panel vibration loads. In this regard, the partial ribs may reinforce areas around tip 272 in large tip airfoils. Rib 280 may originate at structure defining the profile of airfoil 270 including, for example, leading edge 271, trailing edge 273, and/or the like, as shown in FIG. 2A. Rib 280 may also originate from an internal structure within cooling chamber 276 (e.g., rib 286, as shown in FIG. 2B).

In various embodiments, rib 280 may also be oriented within cooling chamber 276 in any suitable fashion. For example, rib 280 may be generally oriented in a fashion such that rib 280 is parallel to a plane associated with tip 272 and a plane associated with root 274. More specifically, rib 280 may be defined between tip 272 and root 274 and may be substantially parallel to root 274 and tip 272. In this regard, rib 280 may be generally transverse (e.g., parallel to the direction of airflow 201) to airfoil 270. Rib 280 may also be at an angle relative to at least one of tip 272 and/or root 274.

In various embodiments, rib 280 may be located at any suitable point within cooling chamber 276 of airfoil 270. Rib 280 may be located in an area associated with and/or adjacent to tip 272 of a large tip airfoil in order to reinforce the area (e.g., to reduce panel bulge and panel vibration impacts given the increased tip area of a large tip airfoil). For example, rib 280 may be located in the portion of airfoil 270 associated with and/or adjacent to tip 272.

In various embodiments, rib 280 may be located in the first third of airfoil 270 as measured from tip 272 as a function of chord 278. In a first configuration, rib 280 may be positioned at a length of less than thirty-five (35) percent of the length of chord 278 as measured from tip 272. In a second configuration, rib 280 may be positioned at a length of less than twenty-five (25) percent of the length of chord 278 as measured from tip 272. In a third configuration, rib 280 may be positioned at a length of less than fifteen (15) percent of the length of chord 278 as measured from tip 272.

In various embodiments, airfoil 270 may further comprise rib 282. Rib 282 may be positioned in the cooling chamber 276 in any suitable manner. For example, rib 282 may generally extend partially between tip 272 and root 274. Rib 282 may originate and/or extend from rib 280. In this regard, they may be connected and/or formed as a single structure. Rib 280 and rib 282 may also be formed as separate structures.

In various embodiments and with reference to FIG. 2B, due to the longer tip 272, rib 282 and rib 286 may form a "V" shape, with larger panel lengths and cooling flow areas closer to the tip 272. Without rib 280, rib 282 and rib 286 would extend all the way to tip 272, increasing the distance between the end of rib 282 and rib 288 as well as the distance between the end of rib 288 and rib 286, resulting in larger panel lengths that may have a higher propensity to bulge. In addition, the cooling flow in the passage between ribs 282 and 288 would have to travel all the way to tip 272 before turning into the passage between rib 288 and rib 286. This may result in lower heat transfer capability of the air as it slows down due to the increase in area and additional unwanted thermal load on the cooling air as a result of the longer path length. By including rib 280, the propensity for panel bulge is reduced and the cooling effectiveness of the air between rib 282 and rib 286 may be improved.

Figure 3:
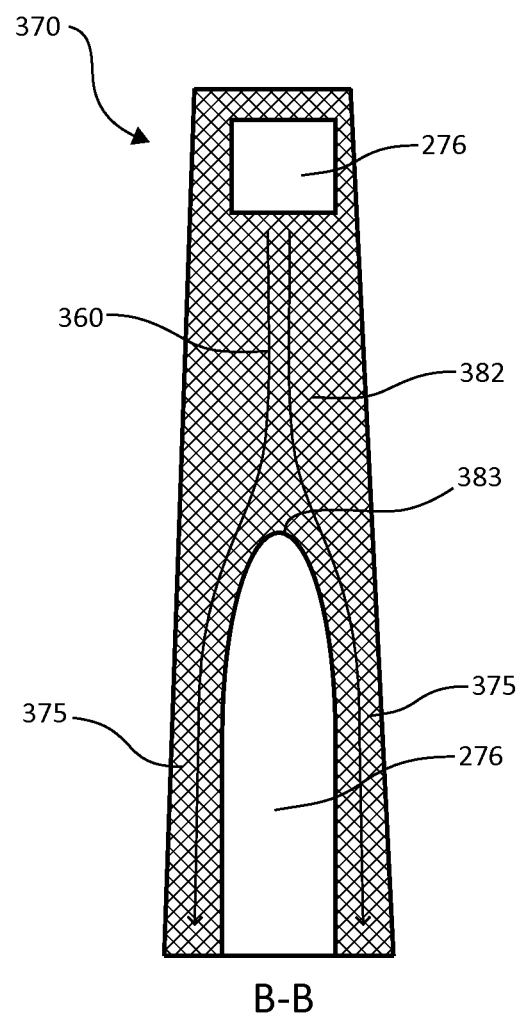
FIG. 3 schematically illustrates a cross-sectional view of a rib of an airfoil, in accordance with various embodiments.

In various embodiments and with reference again to FIG. 2A and FIG. 2B, by employing one or more ribs that do not extend the full length of the cord of airfoil 270 (e.g., one or more partial ribs 282), there is more area at root 274 of airfoil 270 for onboard cooling flow 290. The increase in area at root 274 for onboard cooling flow 290 provides for more balanced air speeds in each of the cavities without making the cavities too small to create issues for manufacturability. Moreover, rib 282 and more specifically rib tip 283 may provide a mechanism for separating and/or directing cooling flow 290 within cooling chamber 276 of airfoil 270. This distribution of cooling flow 290 may reduce the overall heat load on airfoil 270. In various embodiments and with reference to FIG. 3, any of the ribs of airfoil 370 may include ends with elliptical fillets. For example, any rib such as, for example, rib 382 in a cantilevered configuration that has a tip that receives cooling airflow may include or be formed with an elliptical fillet 383. Elliptical fillet 383 may help transfer load 360 from the rib end to a wall 375 of airfoil 370 by creating a smoother load path. As shown in FIG. 3, rib 382, which is a cross-section of rib 282 from FIG. 2B, includes elliptical fillet 383. Elliptical fillet 383 may have an elliptical shape that allows air to smoothly and/or easily pass off or pass by the surface of rib 382 and more specifically the surface profile defining elliptical fillet 383.

In various embodiments, the large tip airfoils described herein may be installed on various gas turbine engine rotating components including, for example, turbine wheels and/or compressor wheels. In this regard, a plurality of large tip airfoils may be installable on a turbine wheel body.

Benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, such benefits, advantages, and any elements that may cause any benefit or advantage to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. An airfoil, comprising:
a root having a first area;
a tip having a second area;
a body having a chord bounded by the root and the tip, the body defining a cooling chamber, the body having:
a first rib substantially perpendicular to the chord;
a second rib extending from a tip region toward the root, the second rib terminating at a point in the cooling chamber between the root and the tip;

a third rib originating in a cantilevered configuration from the first rib and extending towards the root; and a fourth rib originating from the root and extending toward the first rib and terminating between the root and the first rib, wherein the second rib and the third rib are non-parallel to each other.

2. The airfoil of claim 1, wherein the second rib extends from an end of the first rib.

3. The airfoil of claim 1, wherein the second area is larger than the first area.

4. The airfoil of claim 1, wherein the first rib originates in a cantilevered configuration from the second rib.

5. The airfoil of claim 1, wherein the first rib is positioned in the cooling chamber at a distance from the tip that is less than 35 percent of a length of the chord.

6. The airfoil of claim 1, wherein the first rib is positioned in the cooling chamber at a distance from the tip that is less than 15 percent of a length of the chord.

7. The airfoil of claim 1, further comprising a fifth rib originating at the root and terminating at the first rib.

8. The airfoil of claim 7, wherein the first rib, the second rib, the third rib, the fourth rib, and the fifth rib define a plurality of channels.

9. The airfoil of claim 1, wherein the second rib terminates substantially short of the root.

10. The airfoil of claim 1, wherein the second rib terminates at a distance from the tip that is less than 50 percent of the chord.

11. The airfoil of claim 1, wherein the second rib terminates in an elliptical fillet.

12. A turbine wheel comprising;
a wheel body, and
a plurality of airfoils, each of the plurality of airfoils defining a cooling chamber and comprising, a first rib extending partially between a root of the airfoil and a tip of the airfoil, wherein the length of the first rib is less than 50 percent of the chord between the root and tip and the first rib terminates in an elliptical fillet, and
a second rib extending partially across the cooling chamber between the root and the tip and being substantially parallel to the root and the tip.

13. The turbine wheel of claim 12, wherein the root of each of the plurality of airfoils has a first area and the tip of each of the plurality of airfoils has a second area, and wherein the first area is smaller than the second area.

14. The turbine wheel of claim 12, wherein each of the plurality of airfoils has a chord, and wherein the first rib terminates in the cooling chamber at a distance from the tip that is less than 50 percent of a length of the chord.

15. The turbine wheel of claim 12, wherein the second rib extends from at least one of a leading edge and a trailing edge of at least one of the plurality of airfoils.

16. The turbine wheel of claim 12, wherein the second rib extends from the first rib and terminates in the cooling chamber.

17. A gas turbine engine, comprising: a compressor section; a combustor in fluid communication with the compressor section; a turbine section in fluid communication with the combustor, the turbine section comprising a turbine wheel having a plurality of airfoils, each of the plurality of airfoils defining a chamber that is configured to receive and distribute cooling airflow, each of the plurality of airfoils comprising, a root, a tip, a chord between the root and the tip, a first rib extending partially between the root and the tip, and a second rib extending partially across the chamber substantially perpendicular to the chord between the root and the tip, wherein the first rib terminates in an elliptical fillet.

18. The gas turbine engine of claim 17, wherein the second rib is positioned in the chamber at a distance from the tip that is less than 35 percent of a length of the chord.

19. The gas turbine engine of claim 17, wherein the second rib extends from at least one of a leading edge and a trailing edge of at least one of the plurality of airfoils.

20. The gas turbine engine of claim 17, wherein the second rib extends from the first rib and terminates in the chamber.

* * * * *